Jan. 2, 1968  W. H. LOFTIS  3,361,437
WORKMAN'S CREEPER WITH BRAKE
Filed Feb. 25, 1966
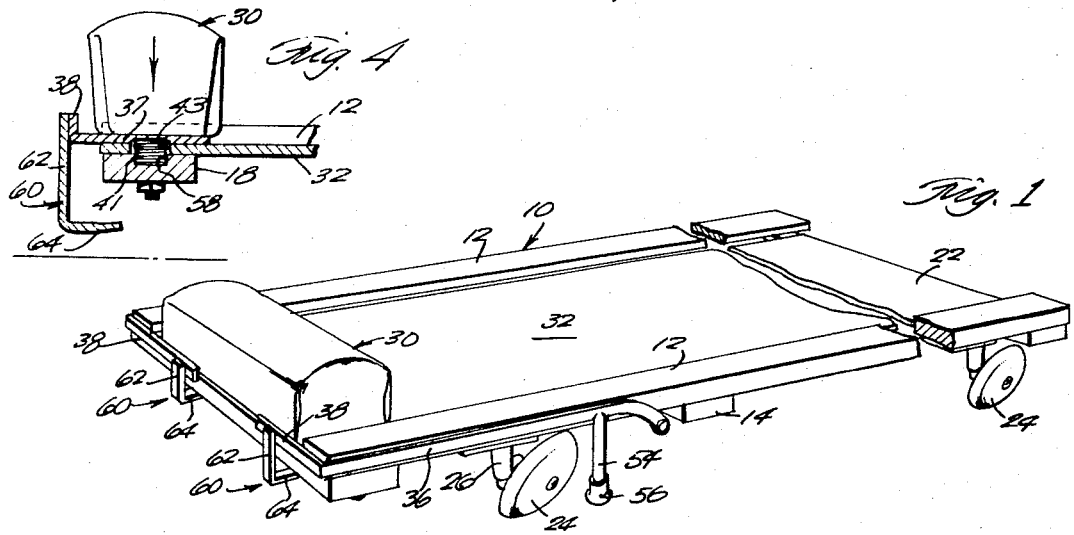
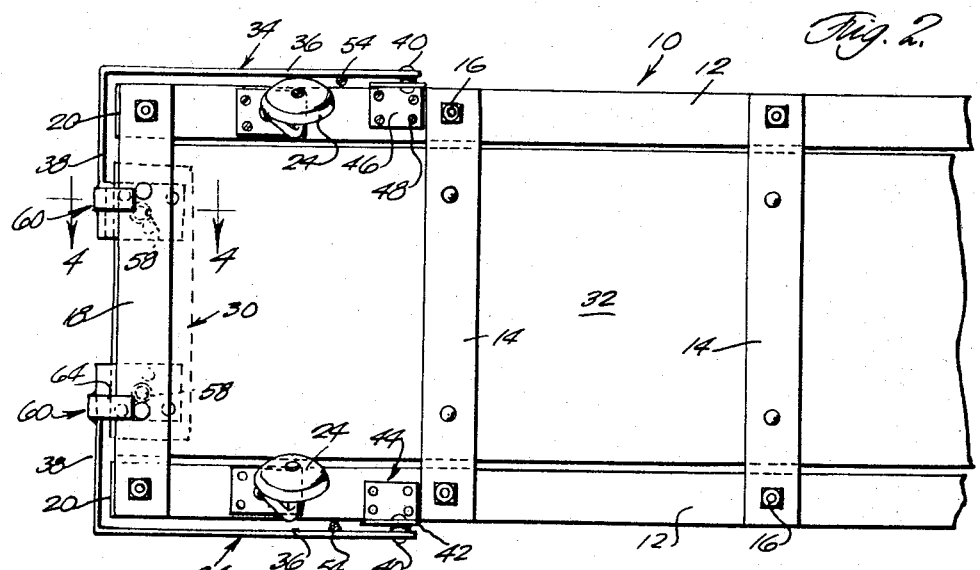
INVENTOR.
WILBUR H. LOFTIS
BY
Berman, Davidson & Berman
ATTORNEYS

United States Patent Office 3,361,437
Patented Jan. 2, 1968

---

3,361,437
WORKMAN'S CREEPER WITH BRAKE
Wilbur H. Loftis, 1660 Taft,
Lemon Grove, Calif. 92045
Filed Feb. 25, 1966, Ser. No. 530,199
7 Claims. (Cl. 280—32.6)

This invention relates to a workman's creeper of the type having a headrest, and more particularly to a creeper of this type wherein creeper braking mechanism is applied by pressure exerted upon its headrest.

In working beneath vehicles and the like, while lying upon a mobile creeper, the worker is subjected to strains and stresses, especially when handling heavy parts, which are fatiguing and reduce efficiency. Inadvertent shifting of the creeper on the floor beneath the vehicle, while the worker is under strain, can result in serious personal injury, spoiled work, and/or damage to the parts being handled. Heretofore, worker-operated brake means, intended to reduce or eliminate inadvertent shifting of creepers, have required, for their operation, onerous extra and unnatural movements by the worker, which, while obtaining some braking effect, add substantially to the exertions of the worker.

The primary object of the present invention is the elimination of the above-outlined drawbacks by the provision, in a creeper of the character indicated above, of braking means which is effectively operated and applied, simply by depression of the existent headrest, against the resistance of spring means, whereby the worker is enabled, without removing or changing the normal position of rest of his head on the headrest, to easily and comfortably apply the braking means.

Another object of the invention is the provision of a braking means of the character indicated above, which is simple, and mechanically sound, is composed of a small number of uncomplex and easily assembled parts, and which is readily incorporated in conventional forms of creepers, without major alteration thereof.

In the drawings:

FIGURE 1 is a contracted perspective view of a device of the invention, showing the braking mechanism in depressed, applied position;

FIGURE 2 is a fragmentary bottom plan view of FIGURE 1;

FIGURE 3 is a fragmentary side elevation, showing the braking mechanism in elevated, retracted position; and, FIGURE 4 is an enlarged fragmentary vertical section, taken on the line 4—4 of FIGURE 2.

Referring in detail to the drawings, the illustrated device comprises a longitudinally elongated horizontal rectangular open creeper frame 10, composed of parallel spaced side members 12, spaced and connected by longitudinally spaced, underlying intermediate cross members 14, secured to the side members 12, as indicated at 16. A head end cross member 18 is similarly secured to the undersides of the side members 12, at and flush with the head end 20 thereof. A foot end cross member 22, like the head end cross member 18, is provided at the related ends of the side members. Caster wheels 24, located adjacent to and spaced inwardly from the cross members 18 and 22, are mounted to the undersides of the side members 12, by means of pendant brackets 26, in which one end of crank arms 28 are securably journalled, the wheels 24 being journalled on the other ends of the crank arms, in concentric relation to the brackets 26.

In accordance with the present invention, the usual cushioned headrest 30, of transversely elongated form, and shorter than the width of the creeper frame 10, is not supported on the head cross member 18, or upon the body supporting panel 32, which fixedly overlies the intermediate frame cross members 14. Instead, the headrest 30 is fixed to and is carried by a pair of generally horizontal levers 34, which outlie the sides and the head end of the creeper frame 10.

The levers 34 are L-shaped, are similar bent reversed in position relative to each other, and are composed of relatively long longitudinal arms 36 having relatively short transverse arms 38, on their outer ends. The transverse arms 38 are fixed to and extend inwardly along the outer side of the lower part of the headrest 30. As shown in FIGURE 4, the transverse arms 38 preferably have fixed thereto flat horizontal, longitudinally inwardly extending plates 39, which underlie and are suitably fixed to the underside of the headrest 30.

At their inner ends, the long arms 36 are severally fixedly pivoted, as indicated at 40, on the laterally outward sides of the pendant vertical flanges 42 of brackets 44, having horizontal inwardly extending flanges 46, secured, as indicated at 48, to the undersides of the creeper frame side members 12, at locations spaced longitudinally inwardly from the related caster wheels 24. As indicated in FIGURES 1 and 3, the lever arms 36 have downturned terminals 50 which serve to upwardly offset the main portions of the arms 36, relative to the level of the pivots 40, the main portions 52 being straight.

The long lever arms 36 are sufficiently spaced, laterally outwardly of the creeper frame side members 12, to provide for free clearance of pendant brake feet 54 which are suitably fixed, at their upper ends, to the inward sides of the arms 36, at locations between the downturned terminals 50 and the adjacent caster wheels 24. The brake feet 54 are disposed perpendicular to the main portions 52 of the lever arms 36, and have non-slip, preferably resilient CPS 56, on their lower ends.

Retracting springs, here shown as being coil springs 58, are compressed between and are suitably fixed, at related ends thereof, to the underside of the headrest plates 39, and in sockets 41, provided in the top of the head end cross member 18, the panel 32 being provided with openings 43 freely passing the springs. The springs 58 serve, in the absence of substantial downward pressure upon the head rest 30, to elevate the assembly of the levers 34, the headrest 30, and the brake feet 54, relative to the creeper frame 10, so that the brake feet are out of contact with the surface S, upon which the creeper is movably supported.

For the purpose of limiting the elevation of the said assembly, by the springs 58, inverted L-shaped stops 60 are provided on the short transverse lever arms 38. The stops 60 have vertical legs 62, suitably secured, at their upper ends, to the arms 38 and horizontal, longitudinally inwardly extending legs 64, on the lower ends of the legs 62, which, as shown in FIGURE 3, are adapted to make stop engagements with the underside of the head cross member 18 of the creeper frame 10.

In use and operation, the worker assumes his usual recumbent position on the creeper, with his head lightly resting upon the headrest 30, maneuvers the creeper to the desired position, relative to his work, and then simply increases the downward pressure upon the headrest 30, with his head, in a normal completion of his relationship to the creeper and to the work, whereby the brake feet 54 are applied to the surface S, and hold the creeper stationary thereon.

What is claimed is:

1. A creeper comprising a horizontal creeper frame supported on caster wheels, said frame having a head end, lever means pivoted on the frame at a location spaced longitudinally inwardly from said head end, said lever means extending to said head end, a headrest fixedly supported on said lever means at said head end, said lever means having downwardly extending brake foot means fixed to and located intermediate the ends of the lever means, and retracting spring means connected between the creeper frame and the lever means and normally elevating the headrest above the frame and the brake foot means out of braking contact with the surface engaged by the caster wheels.

2. A creeper according to claim 1, wherein said creeper frame comprises spaced side members and a head cross member extending between and fixed to the side members at the head end of the frame, said headrest overlying said head end cross member, said spring means being compressed between the head rest and said cross member.

3. A creeper according to claim 1, wherein said creeper frame comprises spaced side members and a head cross member extending between and fixed to the side members at the head end of the frame, said headrest overlying said head end cross member, said spring means being compressed between the head rest and said cross member, said lever means comprising L-shaped levers having long arms extending along and outlying said frame side members, said long arms having inner ends pivoted on the side members and outer ends, laterally inwardly extending short arms on the outer ends of the long arms, and means fixing said short arms to the headrest, said brake foot means comprising brake feet fixed at their upper ends to the long arms intermediate the ends thereof.

4. A creeper according to claim 1, wherein said creeper frame comprises spaced side members and a head cross member extending between and fixed to the side members at the head end of the frame, said headrest overlying said head end cross member, said spring means being compressed between the head rest and said cross member, said lever means comprising L-shaped levers having long arms extending along and outlying said frame side members, said long arms having inner ends pivoted on the side members and outer ends, laterally inwardly extending short arms on the outer ends of the long arms, and means fixing said short arms to the headrest, said brake foot means comprising brake feet fixed at their upper ends to the long arms intermediate the ends thereof, said short arms being spaced outwardly from the head end of the creeper frame.

5. A creeper according to claim 1, wherein said creeper frame comprises spaced side members and a head cross member extending between and fixed to the side members at the head end of the frame, said headrest overlying said head end cross member, said spring means being compressed between the head rest and said cross member, said lever means comprising L-shaped levers having long arms extending along and outlying said frame side members, said long arms having inner ends pivoted on the side members and outer ends, laterally inwardly extending short arms on the outer ends of the long arms, and means fixing said short arms to the headrest, said brake foot means comprising brake feet fixed at their upper ends to the long arms intermediate the ends thereof, said short arms having pendant stops fixed thereon, said stops having longitudinally inwardly extending horizontal legs underlying and adapted to engage the underside of said head cross member in the elevated retracted position of the lever means.

6. A creeper according to claim 1, wherein said creeper frame comprises spaced side members and a head cross member extending between and fixed to the side members at the head end of the frame, said headrest overlying said head end cross member, said spring means being compressed between the head rest and said cross member, said head cross member being formed with sockets in its top, said spring means comprising coil springs seated in said sockets and engaged with the underside of the headrest.

7. A creeper according to claim 1, wherein said creeper frame comprises spaced side members and a head cross member extending between and fixed to the side members at the head end of the frame, said headrest overlying said head end cross member, said spring means being compressed between the head rest and said cross member, said lever means comprising L-shaped levers having long arms extending along and outlying said frame side members, said long arms having inner ends pivoted on the side members and outer ends, laterally inwardly extending short arms on the outer ends of the long arms, and means fixing said short arms to the headrest, said brake foot means comprising brake feet fixed at their upper ends to the long arms intermediate the ends thereof, said short arms having longitudinally inwardly extending plates fixed thereon, said plates being fixed to the underside of the headrest, said spring means being engaged with the undersides of said plates.

References Cited
UNITED STATES PATENTS

| | | | |
|---|---|---|---|
| 2,652,576 | 9/1953 | Clark | 280—37.6 X |
| 2,861,279 | 11/1958 | Myers | 5—327 |
| 2,942,693 | 6/1960 | Johnson | 188—5 |

KENNETH H. BETTS, *Primary Examiner.*